United States Patent [19]

Kato et al.

[11] Patent Number: 4,505,584
[45] Date of Patent: Mar. 19, 1985

[54] METHOD AND APPARATUS FOR DETECTING FOCUSSING ERROR SIGNAL OF OBJECTIVE LENS

[75] Inventors: Kiichi Kato; Tohru Musha; Kenichi Ito, all of Hachioji, Japan

[73] Assignee: Olympus Optical Co., Ltd.

[21] Appl. No.: 339,718

[22] Filed: Jan. 15, 1982

[30] Foreign Application Priority Data

Jan. 22, 1981 [JP] Japan .................... 56-7143
May 1, 1981 [JP] Japan .................... 56-65288

[51] Int. Cl.$^3$ ............................ G01J 1/36
[52] U.S. Cl. .................... 356/123; 250/201; 369/45
[58] Field of Search ........ 356/123, 352; 350/164; 250/201, 204; 369/45

[56] References Cited

U.S. PATENT DOCUMENTS 3,043,976  7/1962  Kossel .................... 350/164
4,390,781  6/1983  Musha .................... 369/45

FOREIGN PATENT DOCUMENTS 129730 10/1980 Japan .................... 356/136

*Primary Examiner*—R. A. Rosenberger
*Attorney, Agent, or Firm*—Parkhurst & Oliff

[57] ABSTRACT

In order to derive a focussing error signal of an objective lens with respect to a video disc on which a light beam is focussed by the objective lens, the P-polarized light beam is made incident upon a prism and then upon a thin film which is applied to the prism and has a refractive index higher than that of the prism, and the light beam reflected by a boundary surface between the thin film and the air is detected by a photo-detector having two light receiving regions. The thin film is made of material having a higher refractive index than that of the prism. Between the prism and the thin film there may be interposed at least one additional thin film in such a manner that the lower and higher refractive index thin films are alternately arranged.

28 Claims, 15 Drawing Figures

FIG_3
PRIOR ART

Light Flux from Disc 16

FIG_7

FIG_8

FIG_10

METHOD AND APPARATUS FOR DETECTING FOCUSSING ERROR SIGNAL OF OBJECTIVE LENS

BACKGROUND OF THE INVENTION

The present invention relates to a method for detecting a focussing condition of an objective lens with respect to an object such as a record medium on which a light spot has to be focussed by said objective lens and to an apparatus for carrying out such a focus detecting method.

Such focus detecting method and apparatus are advantageously applied to an apparatus in which a scanning light spot is projected by an objective lens onto one or more information tracks recorded spirally or concentrically on a disc-shaped record medium to read out an information signal recorded along the track.

In an apparatus for reproducing or picking-up an information signal from the above mentioned record medium, the record medium is usually called as a video disc in which encoded video and audio signals are recorded as optical information such as optical transmissivity, reflection and phase properties. While the video disc is rotated at a high speed such as thirty revolutions per second, i.e. 1,800 rpm, a laser beam emitted from a laser light source such as a helium-neon gas laser is focussed on the tracks of the disc as a light spot and the optical information is read out. One of important properties of such a record medium is a very high density of recorded information and thus a width of the information track is very narrow and a space between successive tracks is also very narrow. In a typical video disc described in, for instance, Philips Technical Review, Vol. 33, 1973, No. 7, a pitch of the tracks amounts only to 2 μm. Therefore the diameter of light spot should be correspondingly small such as 1 to 2 μm. In order to pick-up correctly the recorded information from such tracks having very narrow width and pitch, an error in a distance between the objective lens and the tracks, i.e. a focussing error should be reduced as little as possible to make a spot diameter as small as possible.

To this end, the apparatus is provided with a focussing control system in which an amount and a direction of a de-focussed condition of the objective lens with respect to the disc surface are detected to produce a focussing error signal and the objective lens is moved in a direction of the optical axis of objective lens in accordance with the detected focussing error signal.

FIG. 1 is a schematic view illustrating a known focus detection system in an optical pick-up apparatus. A light source 1 comprises a laser and emits light which is linearly polarized in a plane of the drawing of FIG. 1. The light is collimated by a collimator lens 2 into a parallel light beam which is then transmitted through a polarizing prism 3 and a quarter-wavelength plate 4. The light beam is further focussed by an objective lens 5 as a light spot on a disc 6 having one or more information tracks 6a of crenellated pit construction. Then, the light is reflected by the information track and impinges upon the polarizing prims 3 by means of the objective lens 5 and the quarter-wavelength plate 4. The light impinging on the prism 3 is polarized in a direction perpendicular to the plane of the drawing, because it has transmitted through the quarter-wavelength plate 4 twice and thus, is now reflected by the polarizing prism 3. The light flux reflected by the polarizing prism 3 is converged by a condenser lens 7 and a cylindrical lens 8. Since the cylindrical lens 8 has a focussing power only in one direction, the shape of the focussed beam formed by the condenser lens 7 and the cylindrical lens 8 varies as shown in FIG. 1 with respect to an in-focussed condition in mutually orthogonal directions, when the disc 6 moves up and down. In the known apparatus, this variation in shape is detected by a light detector (not shown) divided into four sections and arranged at a focal plane of the lens system 7, 8 to produce a focussing error signal. The focussing error signal thus detected is supplied to a focussing mechanism such as a moving coil mechanism to move the objective lens 5 in its axial direction.

In the known focus detecting system, since a relatively long optical path is required to focus the light beam after being reflected by the polarizing prism 3, there is a drawback that an optical system is liable to be large in size. Further, since the light detector having the four sections must be arranged precisely in three axial directions, i.e. in the optical axis direction and in two orthogonal directions perpendicular to the optical axis, the adjustment in positioning the light detector is quite critical and requires a time-consuming work. Moreover, since a dynamic range in which the accurate focussing error signal can be obtained due to the deformation of the focussed beam is relatively small, any focussing error signal could not be produced if the disc deviates from a given position only by a relatively small distance.

There has been proposed a method and an apparatus which can obviate the above mentioned drawbacks and can detect a focussing error signal of an objective lens with respect to an object onto which a light spot is to be focussed, which method and apparatus have an extremely high sensitivity for focus detection. The method and apparatus of this type are described in Japanese Patent Application No. 54-74,943 filed on June 25, 1979 corresponding to continuation-in-part patent application Ser. No. 195,075 filed on Oct. 8, 1980.

FIG. 2 is a schematic view illustrating an embodiment of the optical pick-up apparatus thereby proposed. In this apparatus, a linearly polarized light beam emitted from a laser light source 11 is collimated into a parallel light beam by a collimator lens 12 and passes through a polarizing prism 13 and a quarter-wavelength plate 14. Then, the parallel light beam impinges upon an objective lens 15 and is focussed on an information track of a disc 16 as a small light spot. The light beam reflected by the disc 16 is optically modulated in accordance with information recorded in the track and is reflected by the polarizing prism 13. The construction and operation of the optical system so far explained are entirely same as those of the known optical system shown in FIG. 1. The light flux reflected by the polarization prism 13 impinges upon a detection prism 17 having a reflection surface 18 and the light flux reflected by this surface 18 is received by a light detector 19. The reflection surface 18 is so arranged with respect to the incident light that under an in-focussed condition it makes a given angle wih respect to the incident light (parallel light flux) which angle is equal to a critical angle or slightly smaller or greater than the critical angle. Now, for the time being, it is assumed that the reflection surface 18 is set at the critical angle. In the in-focussed condition, the whole light flux reflected by the polarizing prism 13 is totally reflected by the reflection surface 18. In practice, a small amount of light is transmitted into a direction n shown in FIG. 2 due to incompleteness of a surface condition of the reflection surface 18. However, such a small amount of transmitted light may be ignored. If the disc 16 deviates from the in-focussed condition in a direction a in FIG. 2 and a distance between the objective lens 15 and the disc 16 is shortened, the light reflected by the polarizing prism 13 is no longer the parallel beam, but changes into a diverging light beam including extreme light rays $ai_1$ and $ai_2$. On the contrary, if the disc 16 deviates in the opposite direction b, the parallel light beam is changed into a converging light beam including extreme light rays $bi_1$ and $bi_2$. As can be seen in FIG. 2, light rays from an incident optical axis $OP_i$ to the extreme light ray $ai_1$ have incident angles smaller than the critical angle and thus, are transmitted through the reflection surface 18 at least partially as illustrated by $at_1$ (the reflected light being shown by $ar_1$). Contrary to this, light rays between the optical axis $OP_i$ and the extreme light ray $ai_2$ have incident angles larger than the critical angle and thus are totally reflected by the surface 18 as shown by $ar_2$. In case of deviation of the disc 16 in the direction b, the above relation becomes inversed, and light rays below a plane which includes the incident optical axis $OP_i$ and is perpendicular to the plane of the drawing of FIG. 2, i.e. a plane of incidence, are totally reflected by the reflection surface 18 as denoted by $br_1$, and light rays above said plane are at least partially transmitted through the reflection surface 18 as depicted by $bt_2$. As explained above, if the disc 16 deviates from the in-focussed position, the incident angles of the light rays impinging upon the reflection surface 18 vary in a continuous manner about the critical angle except for the center light ray passing along the optical axis $OP_i$. Therefore, when the disc 16 deviates from the in-focussed position either in the direction a or b, the intensity of the light reflected by the reflection surface 18 varies abruptly near the critical angle in accordance with the above mentioned variation in the incident angles. In this case, senses of the variations of the light intensities on both sides of said plane perpendicular to the incident plane and including the incident optical axis $OP_i$ vary in mutually opposite manner. On the contrary, in the in-focussed condition, the light flux impinging upon the detection prism 17 is totally reflected by the reflection surface 18 and thus, the uniform light flux impinges upon the light detector 19. The light detector 19 is so constructed that the lower and upper light fluxes with respect to said plane are separately received by separate regions 19A and 19B, respectively. That is to say, the light detector 19 is divided along a plane which is perpendicular to the incident plane and includes an optical axis $OP_r$ of reflected light.

In FIG. 2, if the disc 16 deviates in the direction a, the light rays of the lower half of the incident light flux have incident angles smaller than the critical angle. Therefore, at least a part of the lower half light flux is transmitted through the reflection surface 18 and the amount of light impinging upon the light receiving region 19A is decreased. While the upper half of the incident light flux has the incident angles larger than the critical angle and thus, is totally reflected by the surface 18. Therefore, the amount of light impinging upon the light receiving region 19B is not changed. On the contrary, if the disc 16 deviates in the direction b, the amount of light impinging upon the region 19B is decreased, but the amount of light impinging upon the region 19A is not changed. In this manner, the output signals from the regions 19A and 19B vary in an opposite manner. A focussing error signal can be obtained at an output 21 of a differential amplifier 20 as a difference signal of these signals from the regions 19A and 19B.

The reflection surface 18 may be set at an angle slightly smaller than the critical angle. In such a case when the disc 16 deviates in the direction a, the amount of light impinging upon the region 19B is first increased and then becomes constant and the amount of light impinging upon the region 19A is decreased abruptly. Whereas, if the disc 16 deviates in the direction b, the amount of light impinging upon the region 19A is first increased and then becomes constant, while the amount of light impinging upon the region 19B is decreased abruptly.

In this manner by detecting a difference in output signals from the light receiving regions 19A and 19B, it is possible to obtain the focussing error signal having an amplitude which is proportional to an amount of the deviation from the in-focussed condition and a polarity which represents a direction of the deviation with respect to the in-focussed condition. The focussing error signal thus obtained is used to effect a focussing control for driving the objective lens 15 in the direction of its optical axis. Further, it is possible to derive an information signal corresponding to the pit information recorded in the information track at an output 23 of an adder 22 which produces a sum signal of the output signals from the regions 19A and 19B. Further, in the in-focussed condition, since the light is scarcely transmitted through the reflection surface 18, a loss of light is very small and in the defocussed condition the half of light flux with respect to the central light ray is totally reflected, but an amount of the other half of light flux reflected by the surface 18 is decreased to a great extent, the difference in the amount of light impinging upon the regions 19A and 19B becomes great. Therefore, the very accurate focus detection can be effected with a higher sensitivity as compared with the known apparatus shown in FIG. 1.

Various experiments and tests have discovered that the sensitivity of the focus detecting apparatus illustrated in FIG. 2 is not sufficiently high and thus could hardly be applied to the focussing control system in the video or audio disc player which requires an extraordinary high accuracy and particularly the stable focussing error signal could not be obtained precisely due to cross-talk of a track signal. In the above mentioned patent application, it has been further proposed to use an elongated detection prism 17' shown in FIG. 3. In this elongated prism 17', the light beam reflected by the polarizing prism 13 is reflected several times between parallel reflection surfaces 18' of the prism 17'. When a reflection ratio of a single total reflection is 1/T, after reflection of N times, the reflection ratio becomes $1/T^N$ and thus, the sensitivity becomes high exponentially. However, the size of the detection prism 17' is liable to be large and thus, it is impossible to obtain a compact optical system. Further, since the opposite reflection surfaces 18' must be accurately in parallel with each other, the detection prism 17' could not be manufactured easily and becomes expensive.

SUMMARY OF THE INVENTION

The present invention has for its object to provide a method of detecting a focussing error with a very high sensitivity.

It is another object of the invention to provide a focus detection method which can be performed by means of a detection prism of a simple construction.

It is still another object of the invention to provide a focus detection method which can improve the freedom of design for arrangement of optical elements.

According to the invention, a method of producing a focussing error signal of an objective lens with respect to an object on which a light beam is to be focussed by the objective lens, comprises introducing at least a part of the light beam reflected by the object into a prism and then into a boundary surface between a thin film which is applied to the prism and has a refractive index different from that of the prism and the air at an incident angle substantially equal to a critical angle, and detecting the light beam reflected by said boundary surface to derive the focussing error signal.

The present invention also relates to an apparatus for deriving a focussing error signal of an objective lens and an object on which a light beam is to be focussed by the objective lens, comprising a prism arranged to receive at least a part of the light beam reflected by the object and collected by the objective lens, at least one thin film applied on said prism and made of material having a refractive index different from that of the prism, and photo-detecting means arranged to receive the light beam reflected by a boundary surface between said thin film and the air and to derive the focussing error signal.

In a preferred embodiment of the invention, the thin film is made of material having a higher refractive index than that of the prism and a P-polarized light is made incident upon said boundary surface.

In another preferred embodiment, the thin film has a lower refractive index than that of the prism and the S-polarized light is made incident upon the boundary surface.

In still another preferred embodiment, between the prism and the thin film there are interposed at least one additional thin film having such a thickness that a phase difference between light rays reflected from upper and lower surfaces of the thin film has odd integer multiple of a half wavelength. Then, the thin films serve as antireflection coatings and thus, the reflection factor is changed further abruptly.

DESCRIPTION OF THE PREFERRED EMBODIMENTS

In principle, reflection of light at a boundary surface between two kinds of medium having different refractive indices is represented by the Fresnel's formula. Now it is assumed that P-polarized light which is polarized in a plane parallel to an incident plane is made incident upon the boundary surface at an incident angle $i_1$ and is refracted at an exit angle $i_2$, a magnitude $r_p$ of an amplitude vector of light reflected by the boundary surface may be expressed by the following equation (1).

$$r_p = \frac{\tan(i_1 - i_2)}{\tan(i_1 + i_2)} \quad (1)$$

Figure 4:
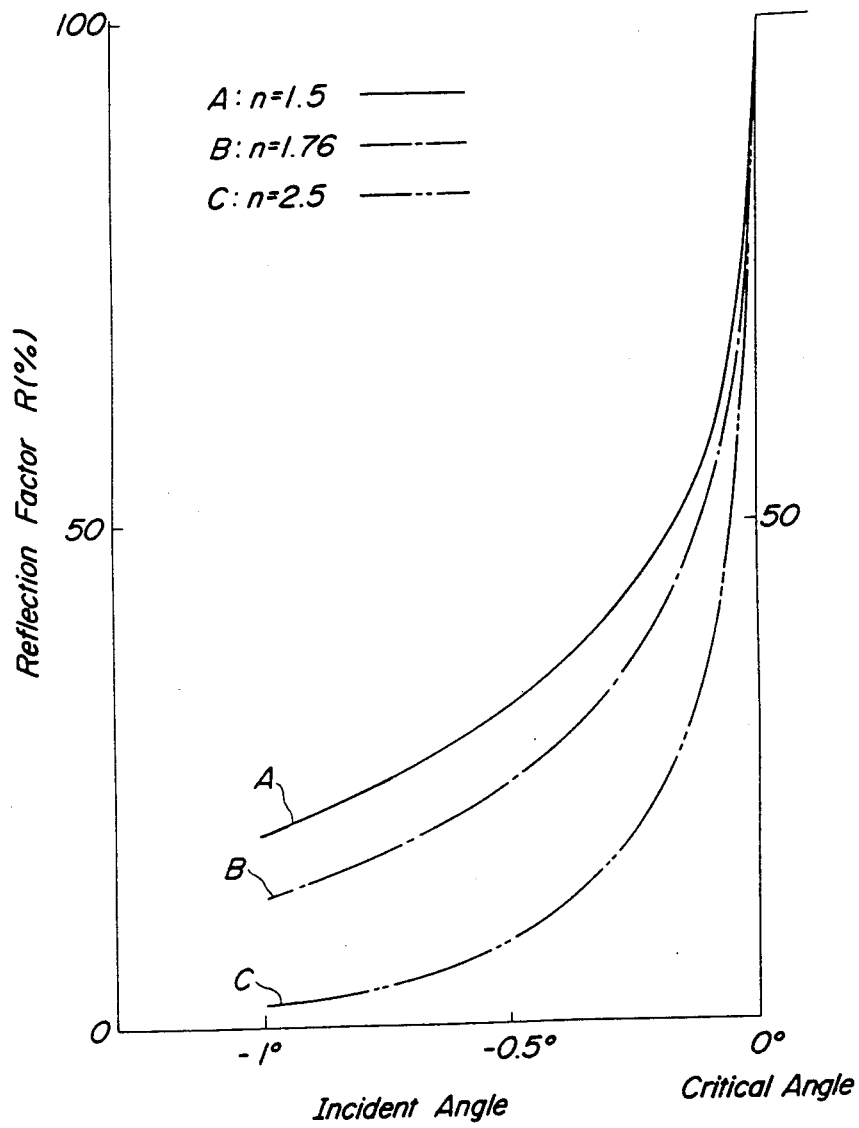
FIG. 4 is a graph showing a variation of reflection factor for various prisms of different refractive indices.
Figure 5:
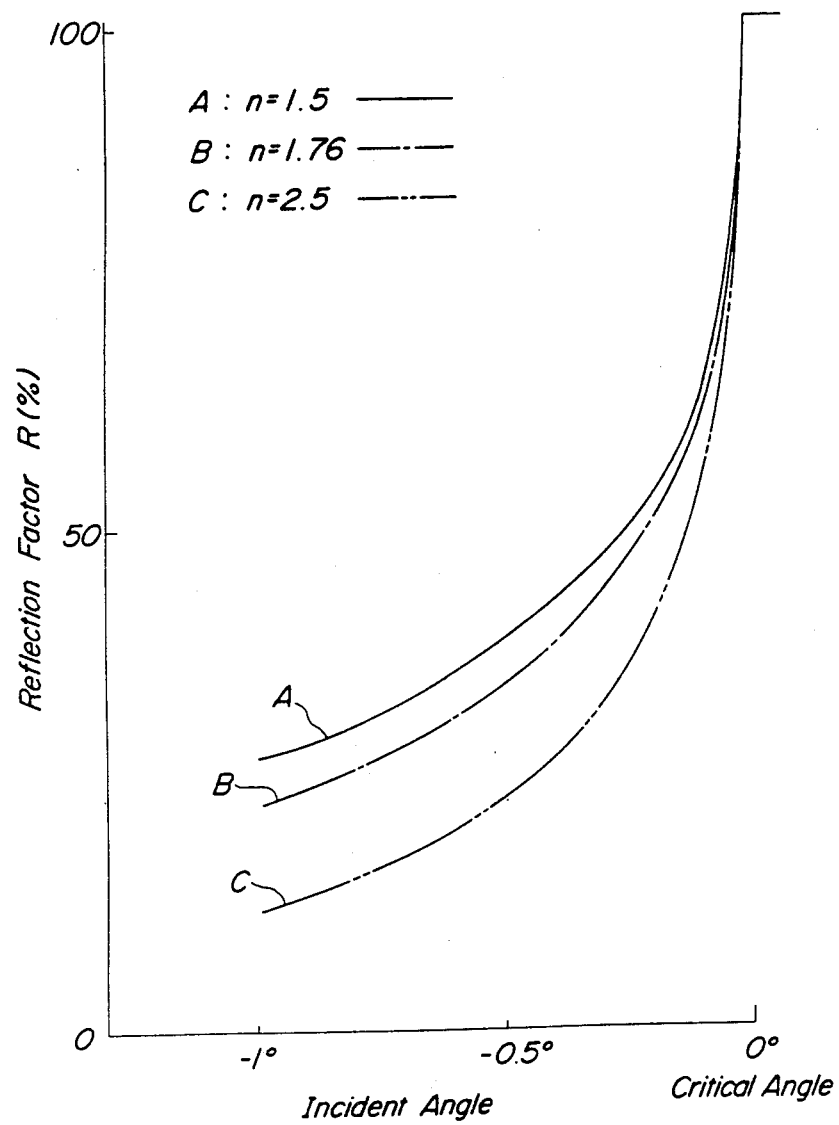
FIG. 5 is a graph depicting the variation of reflection factor with taking into account refraction at incident surface.

It should be noted that since a variation in reflection factor of P-polarized light near a critical angle is larger than that of S-polarized light, for the time being the polarized light is considered to be P-polarized light. From the above equation (1) and Snell's law, the reflection factor R may be expressed as $R = r_p^2$. When the light is made incident from an optical member having a high refractive index into the air, the reflection factor R is changed near the critical angle as illustrated in FIG. 4. In FIG. 4, an axis of abscissa represents an incident angle with taking the critical angle as a reference angle, i.e. zero, and an axis of coordinates represents the reflection factor R in percentage. Curves A, B and C are obtained when using the optical members having refractive indices n of 1.5, 1.76 and 2.5, respectively. From these curves it is apparent that the reflection factor changes more abruptly when the optical member has a higher refractive index. It should be noted here that the incident angle $i_1$ is a value measured in the detection prism and an actual incident angle upon the reflection surface 18 is made smaller than $i_1$ by an angle $$i_S = \arcsin\frac{\sin\psi}{n},$$

wherein $\psi$ is an incident angle with respect to an incident surface of the prism. With taking into account this angle change at the incident surface of the detection prism 17, the variation of the reflection factor in accordance with the variation of the incident angle becomes smaller as illustrated in FIG. 5. Even in this case the variation of the reflection factor becomes larger when the refractive index is greater and thus, the detection sensitivity can be increased by manufacturing the detection prism 17 with material having a higher refractive index. The detection prism 17 is generally made of glass medium and usually available glass has a refractive index of at most about 1.8. Therefore, it is difficult to attain a sufficiently large change in the reflection factor and thus, the high sensitivity could not be achieved.

Figure 1:
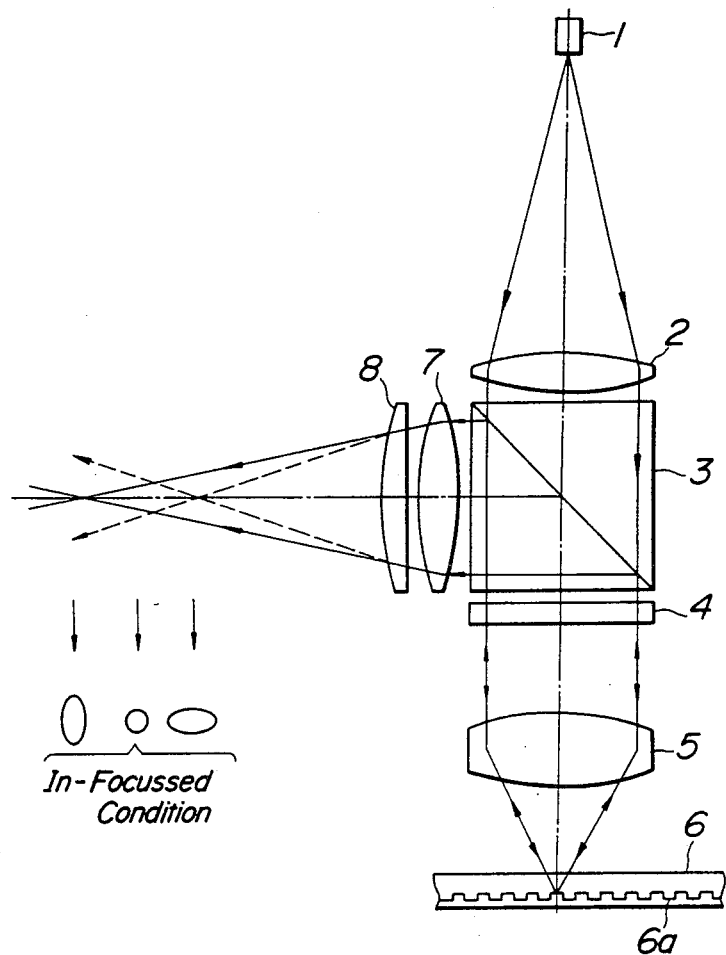
FIG. 1 is a schematic view showing a known focus detection device.
Figure 2:
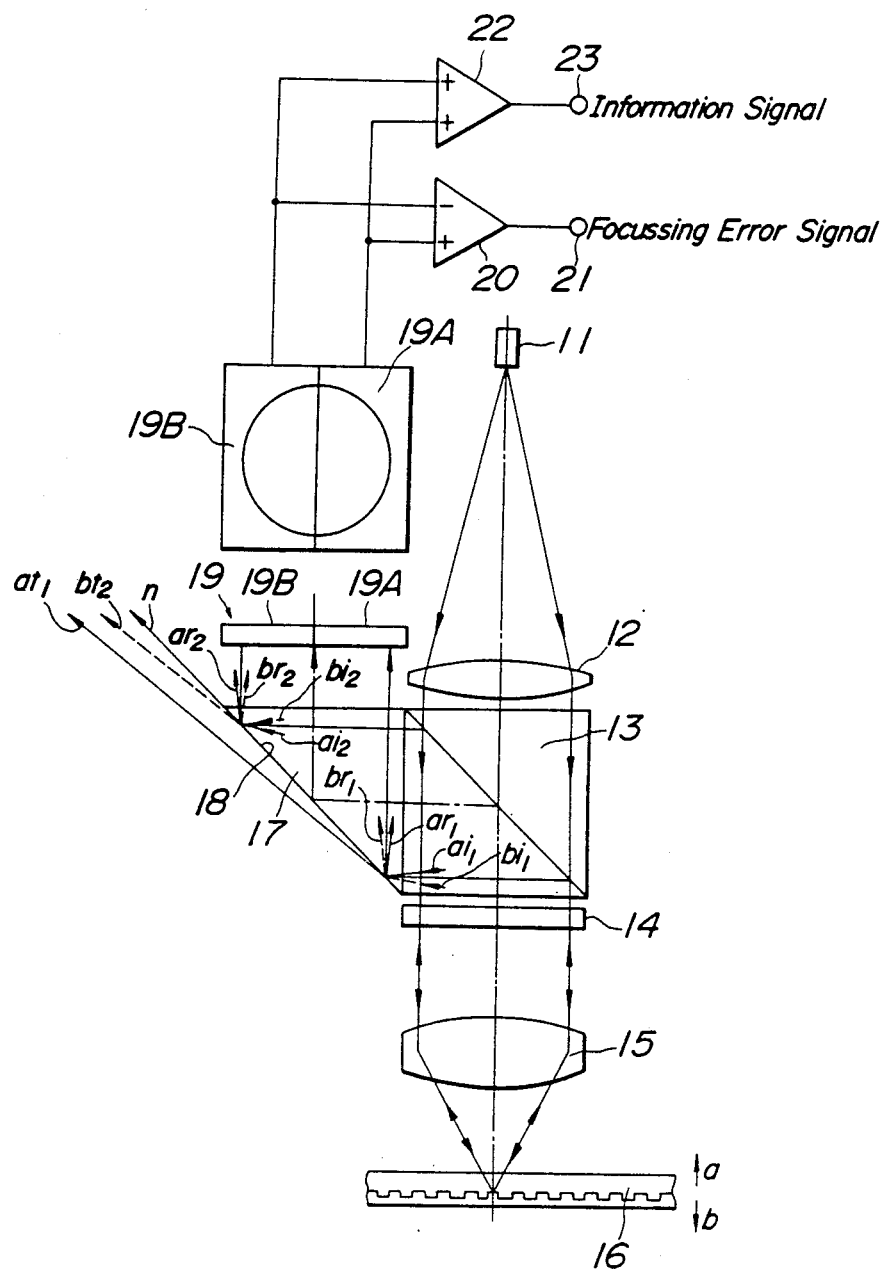
FIG. 2 is another known focus detection device.
Figure 6:
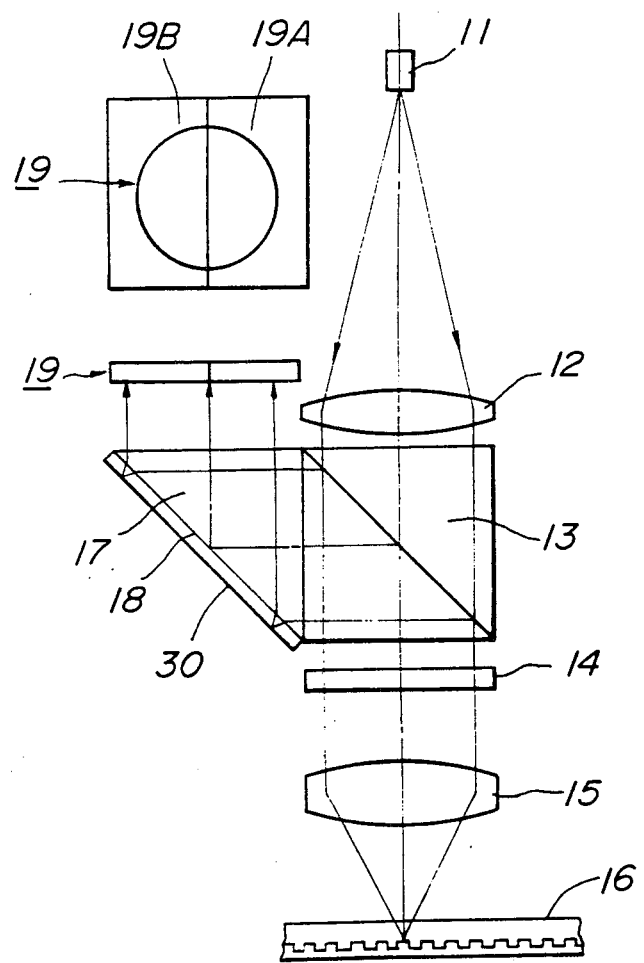
FIG. 6 is a schematic view illustrating an embodiment of the focus detection apparatus according to the invention.

FIG. 6 is a schematic view showing an embodiment of the focus detection apparatus according to the invention. The construction of the apparatus except for the detection prism is entirely same as that of the apparatus shown in FIG. 2 and thus, corresponding portions to those in FIG. 2 are denoted by the same reference numerals used in FIG. 2 and explanation thereof is omitted. According to the invention a thin film 30 made of material having a high refractive index is applied to the reflection surface 18 of detection prism 17. The film 30 may be formed in various manners such as evaporation and spattering. Therefore, the refractive indices $n_1$ and $n_2$ of the detection prism 17 and the thin film 30 should have a relation $n_2 < n_1$.

Figure 7:
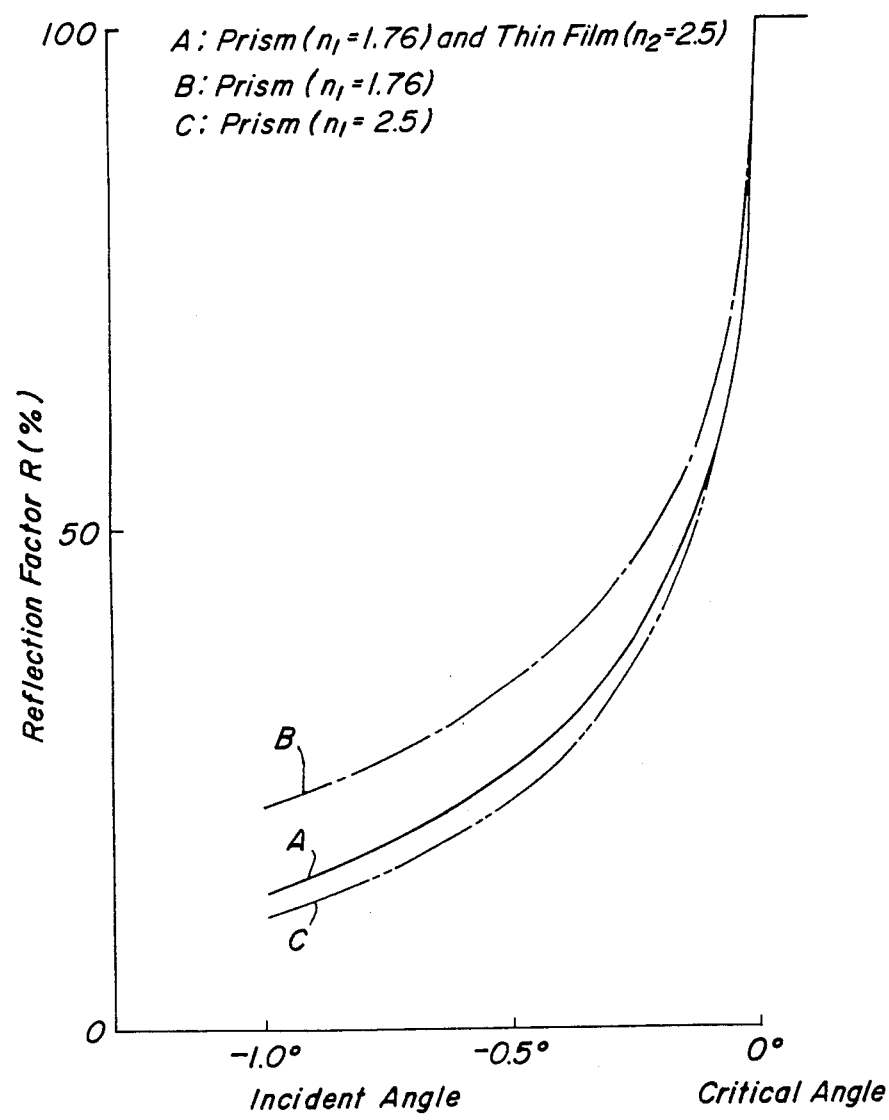
FIG. 7 is a graph showing the variation of reflection factor in the apparatus of FIG. 6.
Figure 8:
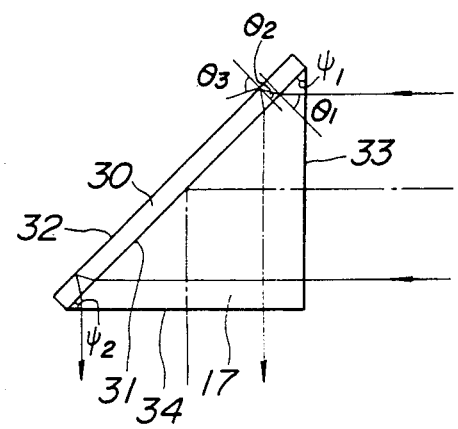
FIG. 8 is a schematic view showing an embodiment of a detection optical system according to the invention.

FIG. 8 is an enlarged schematic view illustrating the detection prism 17 and the thin film 30. An incident angle $\theta_1$ with respect to a boundary surface 31 between the prism 17 and the thin film 30 is so set that an incident angle $\theta_2$ upon a boundary surface 32 between the thin film 30 and the air become near the critical angle, i.e. $\theta_1 = \arcsin(1/n_1)$. The prism 17 has angles $\psi_1$ and $\psi_2$ equal to $\theta_1$ so that incident angles to an incident surface 33 and an exit surface 34 become zero. Now, a numerical example will be explained. The detection prism 17 is made of SF 11 glass having refractive index $n_1 = 1.76$ and the thin film 30 is made of TiO$_2$ having refractive index $n_2 = 2.5$. When any reflection from the boundary surface 32 between the prism 17 and the film 30 is ignored, the variation of the reflection factor R near the critical angle may be represented by a curve A in FIG. 7. In FIG. 7, curves B and C show the variation of the reflection factor R for the prism made of SF 11 glass and the prism having a refractive index of 2.5. The most abrupt variation of the reflection factor can be obtained when the prism is made of material having the refractive index of 2.5 as illustrated by the curve C. However, this curve C is obtained by a theoretical calculation and in fact, it is difficult to obtain such material. Contrary to this, according to the invention, although the prism 17 is made of glass having refractive index of 1.76, the variation of reflection factor resembles that shown by the curve C and the reflection factor R changes abruptly in accordance with the change of incident angle, so that the very high sensitivity can be attained.

In FIG. 7, the reflection at the boundary surface 31 between the prism 17 and the thin film 30 is ignored. However, when the thickness of the film 30 becomes smaller in the order of wavelength, the film serves as an interference film and the reflection factor R can be expressed as follows, wherein $\theta_1$ is an incident angle to the boundary surface 31 between the prism 17 and the thin film 30, $\theta_2$ is an incident angle to the boundary surface 32 between the thin film 30 and the air, $\theta_3$ is an exit angle from the boundary surface 32 into the air, d is a thickness of the thin film 30 and $\lambda$ is a wavelength of the incident light.

$$r_1 = \frac{\tan(\theta_1 - \theta_2)}{\tan(\theta_1 + \theta_2)} \atop r_2 = \frac{\tan(\theta_2 - \theta_3)}{\tan(\theta_2 + \theta_3)} \Bigg\} \quad (2)$$

$$I_r = \frac{r_1 + r_2 e^{i\epsilon}}{1 + r_1 r_2 e^{i\epsilon}} \quad (3)$$

wherein $$\epsilon = \frac{4\pi \cos\theta_2 n_2 d}{\lambda} \quad (4)$$

Thus, the reflection factor R can be expressed as follows.

$$R = I_r^2$$

Figure 9:
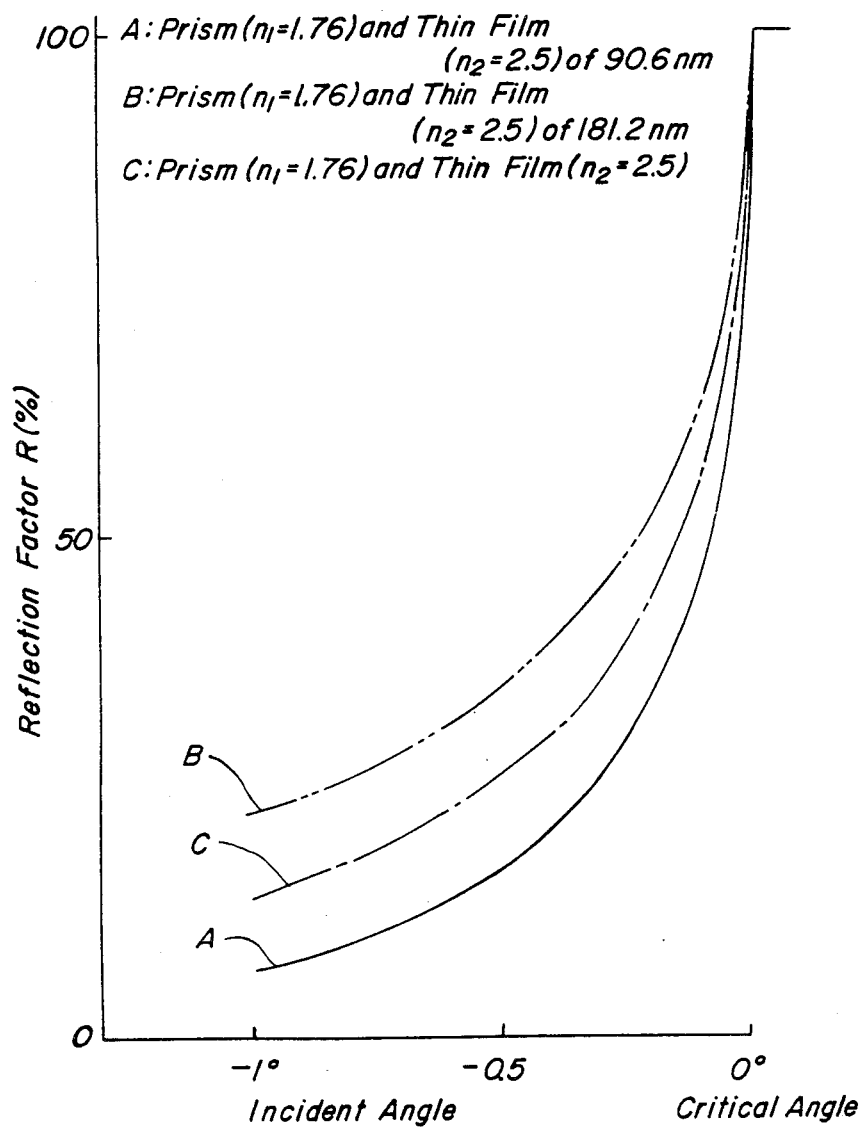
FIG. 9 is a graph showing the variation of reflection factor in the optical system in FIG. 8.

Since near the critical angle $r_2 > 0$, $r_1 > 0$, $r_2 > r_1$, when the following condition is satisfied, $\epsilon = (2m+1)\pi$ (m is an integer), the reflection factor R becomes minimum. A curve A in FIG. 9 shows the variation of reflection factor R near the critical angle for a combination of the detection prism 17 made of SF 11 glass having refractive index $n_1 = 1.76$ and the thin film 30 made of TiO$_2$ having refractive index $n_2 = 2.5$ and the thickness d = 90.6 nm. This thickness satisfies the above condition $\epsilon = (2m+1)\pi$ and thus, the reflection factor R changes very abruptly. A curve B in FIG. 9 shows a case in which the thickness d of the thin film 30 is set to 181.2 nm. In this case the change of reflection factor corresponds to that shown by the curve B in FIG. 7 which shows the variation of reflection factor for the prism alone. A curve C in FIG. 9 corresponds to the curve A in FIG. 7 in which the reflection at the boundary surface 31 between the prism 17 and the thin film 30 is ignored.

Now a condition for the thin film 30 acting as an anti-reflection film will be sought. Since the incident angle is limited near the critical angle, $\theta_3 > \theta_2$, $\theta_2 + \theta_3 > 90°$ and the following equation is always obtained.

$$r_2 = \frac{\tan(\theta_2 - \theta_3)}{\tan(\theta_2 + \theta_3)} > 0 \quad (5)$$

Therefore, the condition for the anti-reflection effect is given by $r_1 > 0$. Then, $\theta_1 > \theta_2$ is obtained from $n_1 < n_2$ and thus, $\tan(\theta_1 + \theta_2) > 0$ is always satisfied. The condition $\theta_1 + \theta_2 < 90°$ can be satisfied as long as the angle $\theta_1$ is smaller than the critical angle. The Brewster angle $\theta_{1b}$ is given by the $\theta_{1b} = \arctan(n_2/n_1)$ and the critical angle $\theta_{1c}$ is expressed by $\theta_{1c} = \arcsin(1/n_1)$. From the above equations, $n_1$, $n_2$ should satisfy the following condition in order to satisfy the condition of $\theta_{1c} < \theta_{1b}$.

$$n_1^2 n_2^2 - n_1^2 - n_2^2 > 0 \quad (6)$$

This condition can be satisfied for almost all $n_1$ and $n_2$.

Figure 10:
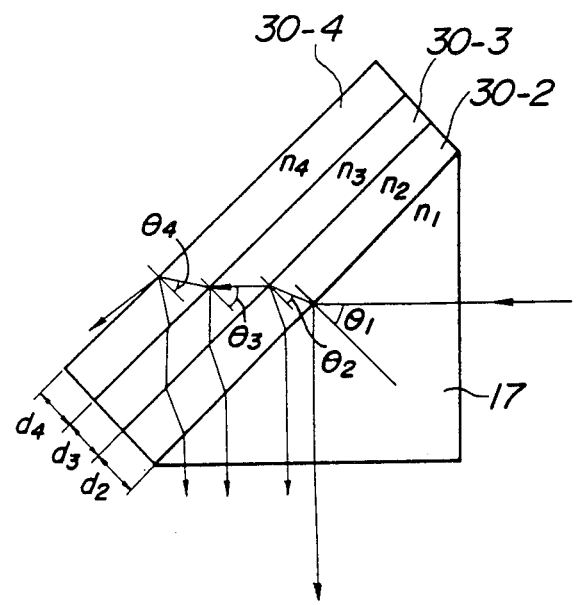
FIG. 10 is a schematic view illustrating another embodiment of the detection optical system according to the invention.

According to the present invention, the thin film 30 is not limited to a single layer, but may be formed as multiple coatings. FIG. 10 illustrates an embodiment of the detection optical system of the multiple-layer construction. Now it is assumed that thin films 30-2, 30-3 ... having the refractive indices of $n_2, n_3$ ... and the thickness of $d_2, d_3$ ... are successively applied to the prism 17 having the refractive index of $n_1$. In such a construction, the reflection factors R can be derived in the following manner. In general, the reflection between $(m-1)^{th}$ thin film and $m^{th}$ thin film can be expressed by the following equation (7).

$$r_m = \frac{\tan(\theta_m - \theta_{m-1})}{\tan(\theta_m + \theta_{m-1})} \quad (7)$$

Then, there is obtained:

$$R_{m-1} = \frac{r_{m-1} + r_m \exp(i\epsilon_m)}{1 + r_{m-1} r_m \exp(i\epsilon_m)} \quad (8)$$

wherein:

$$\epsilon_m = \frac{4\pi n_m d_m \cos\theta_m}{\lambda}$$

$$R_{m-2} = \frac{r_{m-2} + R_{m-1} \exp(i\epsilon_{m-1})}{r_{m-2} + R_{m-1} \exp(i\epsilon_{m-1})} \quad (9)$$

Figure 3:
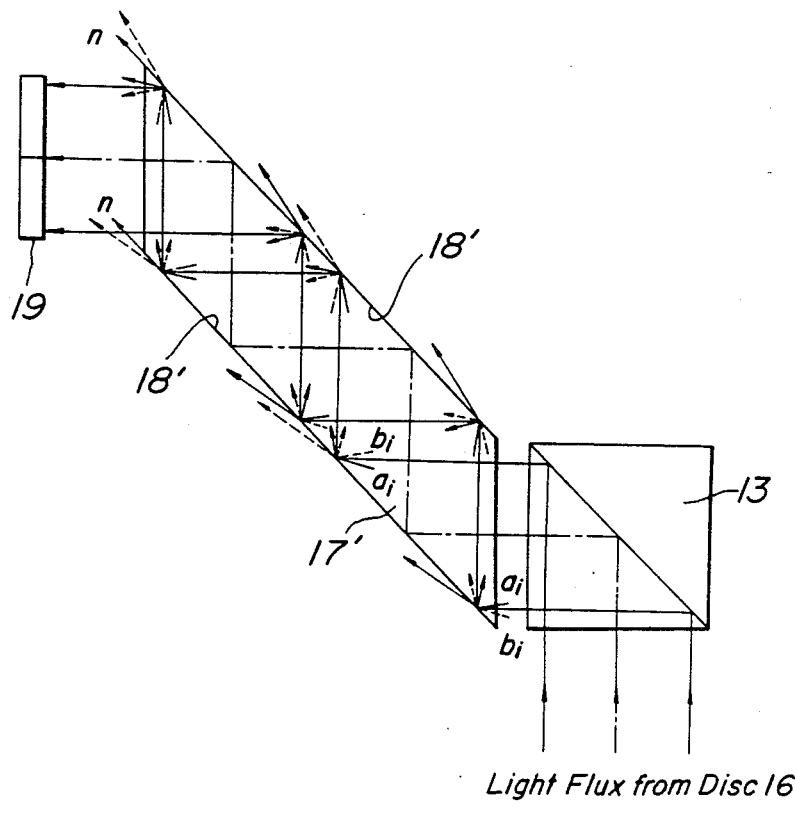
FIG. 3 is a known optical system comprising an elongated detection prism.
Figure 11:
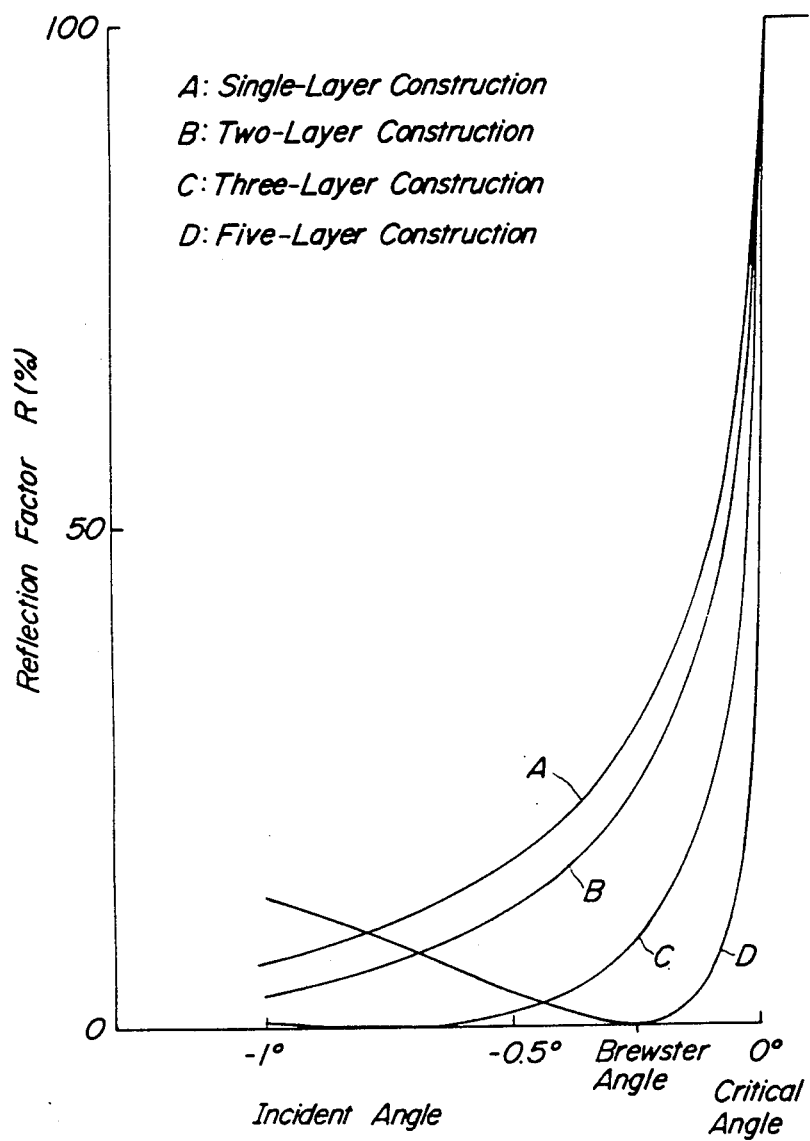
FIG. 11 is a graph showing the variation of reflection factor of the optical system according to the invention.

The above procedure is repeatedly effected and at last $R_1$ may be calculated. Then, the reflection factor R may be obtained by $R = R_1^2$. For the incident angle near the critical angle, the thicknesses and refractive indices which satisfy the necessary condition for the anti-reflection may be derived. However, in the multiple coatings, the calculation becomes quite complicated. Here, for the sake of simplicity, it is assumed that $\epsilon_m = \pi$ and thus, all the films have the thicknesses $d_m$ equally represented by $\lambda/4n_m \cos\theta_m$. Therefore, $d_2 = \lambda/4n_2 \cos\theta_2$, $d_3 = \lambda/4n_3 \cos\theta_3$, $d_4 = \lambda/4n_4 \cos\theta_4$ . . . are obtained. It is further assumed that the films having the higher refractive index and the lower refractive index are alternately applied. FIG. 11 shows the variation in reflection factor R of the detection optical system comprising the prism 17 made of SF 11 glass ($n_1 = 1.76$), the $TiO_2$ film having higher refractive index of 2.5 and the $MgF_2$ film having lower refractive index of 1.4. A curve A represents the optical system having the single thin film of $TiO_2$ and curves B, C and D express the devices having two, three and five thin films, respectively. In the two-layer construction, the $MgF_2$ film of 211.8 nm and the $TiO_2$ film of 90.6 nm are successively applied to the prism 17, and in the three-layer construction, the $TiO_2$ film of 90.6 nm, the $MgF_2$ film of 211.8 nm and the $TiO_2$ film of 90.6 nm are successively applied to the prism 17. In the multiple-layer construction, the reflection factor changes abruptly as compared with the single layer construction due to the anti-reflection effect. Particularly, the three-layer construction shows the much more abrupt change in reflection factor even in comparison with the case in which the light is reflected three times in the elongated prism shown in FIG. 3. In the three-layer construction, it is advantageous to apply the higher, lower and higher refractive index layers successively to the glass prism. As shown by the curves C and D in FIG. 11, the reflection factor is decreased to zero at a certain angle, and after that is increased again.

In case of the multiple-layer construction, the outermost thin film should have the higher refractive index than that of the prism in order to attain the much more abrupt variation of the reflection factor than that obtained by the prism made of material having the same higher refractive index. In the multiple-layer construction, light rays reflected from successive boundary surfaces have opposite phases and thus the reflected light may be cancelled out with taking into account the phase and amplitude and thus, further sharp change in reflection factor can be expected. Moreover, by increasing the number of layers, a Brewster angle at which the reflected light becomes zero is shifted toward the critical angle, so that the reflection factor changes further abruptly.

In the embodiments so far explained, use is made of the P-polarized light. However, according to the invention the S-polarized light may be equally utilized. In case of the S-polarized light, the equation (7) is rewritten into the following equation (7').

$$r_m = \frac{\sin(\theta_m - \theta_{m-1})}{\sin(\theta_m + \theta_{m-1})} \quad (7')$$

Therefore, in this case the outermost thin film should have the refractive index lower than that of the detection prism.

Figure 12:
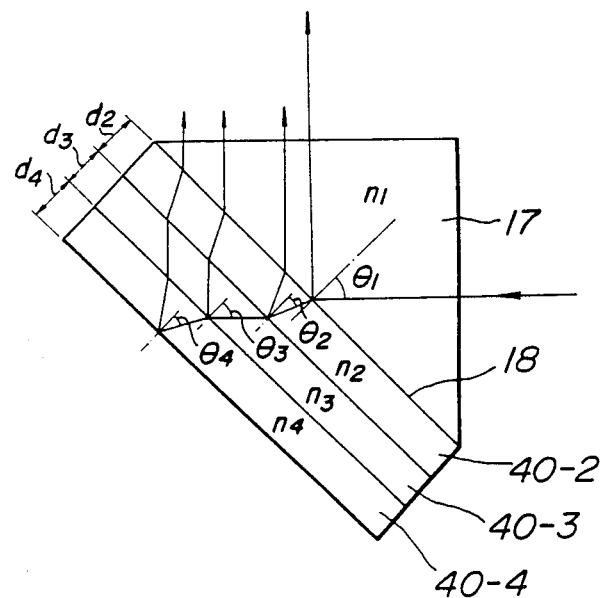
FIG. 12 is a schematic view showing another embodiment of the detection optical system according to the invention.
Figure 13:
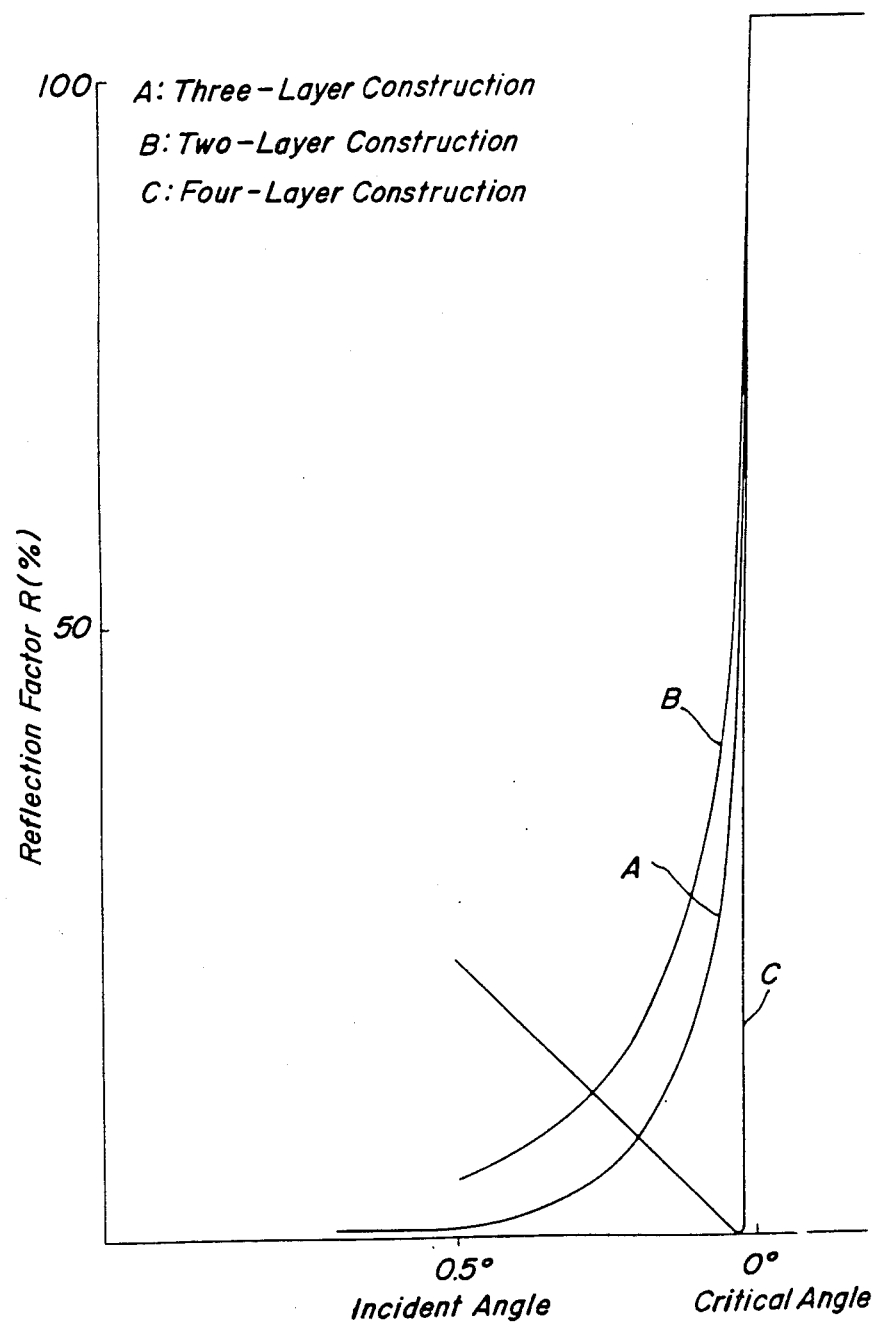
FIGS. 13 and 14 are graphs showing the operation of the optical system according to the invention.

FIG. 12 is a schematic view illustrating an embodiment of the detection optical system for use in combination with the S-polarized light. In this embodiment, the detection prism 17 is made of material having the refractive index $n_1$ of 1.51, and on the reflection surface 18 of the prism are applied successively a thin film 40-2 made of $MgF_2$ having refractive index $n_2$ of 1.4, a thin film 40-3 made of $TiO_2$ having refractive index $n_3$ of 2.5 and a thin film 40-4 made of $MgF_2$ of $n_4 = n_2 = 1.4$. Thicknesses of these thin films are so determined that the equation $\epsilon = \pi$ is satisfied. Therefore, there are obtained $d_2\lambda/4n_2 \cos\theta_2$, $d_3 = \lambda/4n_3 \cos\theta_3$ and $d_4 = \lambda/4n_4 \cos\theta_4$. Also in this case, a phase difference between light rays reflected from the upper and lower surfaces of each thin film becomes a half of the wavelength $\lambda$. Then the variation of reflection factor R becomes very steep as illustrated by a curve A in FIG. 13. According to the invention, the number of thin films is not limited to three, but may be set to any desired number. In any case, the outermost thin film should have refractive index lower than that of the detection prism 17. For instance, a curve B in FIG. 13 shows the change of reflection factor for a two-layer construction in which the higher refractive index layer of $TiO_2$ and the lower refractive index layer of $MgF_2$ are successively applied to the detection prism having the refractive index $n_1 = 1.51$. A curve C in FIG. 13 illustrates the variation in reflection factor for a four-layer construction in which the higher, lower, higher and lower refractive index layers are successively applied to the prism. In the four-layer construction, an extraordinarily abrupt change of the reflection factor can be obtained.

Figure 14:
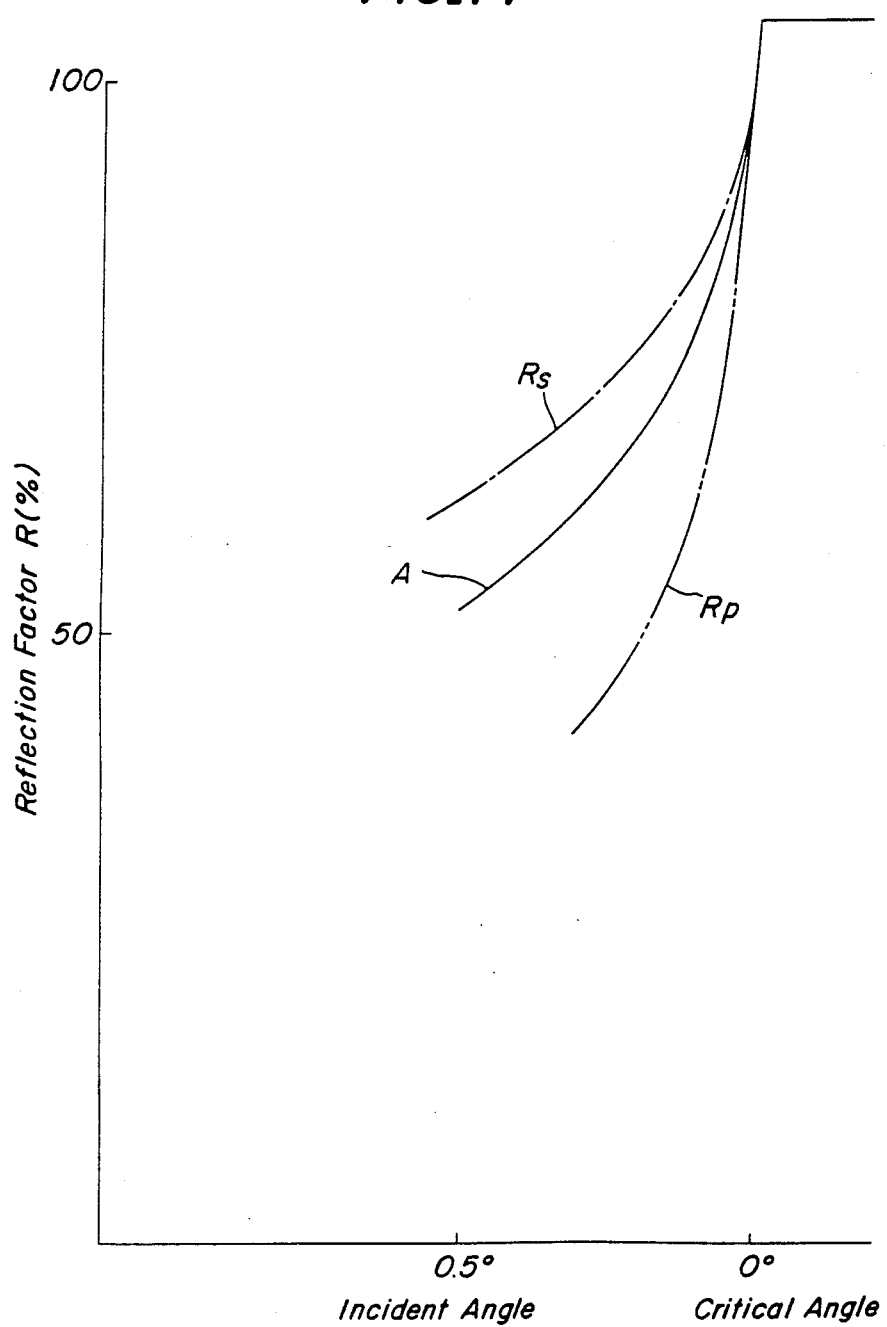

Further in case of using the S-polarized light, it is also possible to apply a single thin film to the detection prism. For instance, a single thin film made of $MgF_2$ having refractive index $n_2$ of 1.4 may be applied to the detection prism having refractive index $n_1$ of 1.51. The thickness of the thin film is so determined that for the S-polarized light which is made incident upon the thin film near the critical angle $\theta_c = 41.70°$, a phase difference between light rays reflected from the upper and lower surface of the thin film becomes a half of the wavelength $\lambda$. The variation of reflection factor R in such an optical system may be represented by a curve A in FIG. 14. In FIG. 14, the variation of reflection factor of the prism without the thin film for S-polarized and P-polarized light are also shown by curves $R_s$ and $R_p$, respectively. The change of reflection factor according to the invention shown by the curve A is smaller than that for the P-polarized light, but is greater than that for the S-polarized light. As apparent from the curves illustrated in FIG. 14, it is preferable to use the P-polarized light as far as the detection sensitivity is concerned. However, in actual designing, it is difficult to utilize the P-polarized light due to the arrangement of the various optical elements, i.e. light source, polarizing prism, photo-detector, etc. Therefore, by means of the solution given by the present invention can offer the advantage that the freedom of design or arrangement of the optical elements can be materially increased. Further, when the thin films are made of mechanically hard material such as $TiO_2$ and $SiO_2$, the reflection surface of detection prism can be effectively protected against injury.

Figure 15:
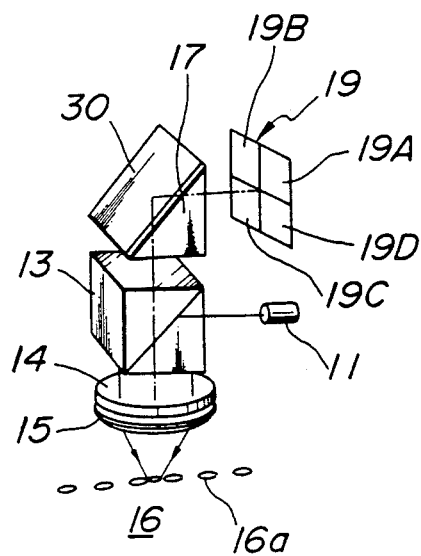
FIG. 15 is a schematic view illustrating still another embodiment of the focus detection apparatus according to the invention.

The present invention is not limited to the embodiments explained above, but may be altered or modified in various ways. In the above embodiments, the object onto which the light beam is to be focussed is the video and audio discs, but may be any kind of object. Further, the optical arrangement except for the detection prism and thin film may be modified in many ways. For instance, as shown in FIG. 15, the S-polarized light emitted from a light source 11 is reflected by a polarizing prism 13 and the reflected light is focussed onto an information track 16a in a disc 16 by means of a quarter-wavelength plate 14 and an objective lens 15. The light reflected by the disc 16 is then collected by the objective lens 15 and is converted into the P-polarized light by means of the quarter-wavelength plate 14. The P-polarized light is now transmitted through the polarizing prism 13 and is made incident upon a detection prism 17 to which is applied a thin film 30 made of higher refractive index than that of the prism. The P-polarized light reflected by the thin film 30 is made incident upon a photo-detector 19 having four light receiving regions 19A to 19D. Then, an information signal stored in the disc 16 may be reproduced as a sum of output signals from the four regions 19A to 19D. A focussing error signal may be derived as a difference between a first sum of output signals from the regions 19A and 19B and a second sum of output signals from the regions 19C and 19D. In this embodiment, a tracking error signal representing a positional deviation of the light spot with respect to the track 16a in a direction perpendicular to an optical axis of the objective lens 15 as well as to the track tangential direction may be obtained as a difference between a third sum of output signals from the regions 19A and 19D and a fourth sum of output signals from the regions 19B and 19C.

According to the present invention, the following advantageous effects can be achieved.

(1) Since the variation of reflection factor in accordance with the change in the incident angle can be materially increased as compared with the detection prism without a thin film, the focussing error signal can be obtained with the very high sensitivity.

(2) The detection prism itself can be made of ordinary optical glass material which is easily available.

(3) Since it is not necessary to use the elongated prism having parallel reflection surfaces between which the light is reflected several times, the prism can be made small in size and light in weight and can be manufactured easily.

(4) In case of the multiple-layer construction, the variation of the reflection factor can be further increased due to the anti-reflection effect.

(5) Since both the P-polarized and S-polarized light can be used, the freedom of design can be improved.

(6) When the thin film is made of hard material, the prism can be protected against injury.

What is claimed is:

1. A method of producing a focussing error signal of an objective lens with respect to an object on which a light beam is to be focussed by the objective lens, comprising:

introducing at least a part of the light beam reflected by the object into a prism and then into a boundary surface between a thin film which is applied to the prism and the air at an incident angle substantially equal to a critical angle of total reflection, the thin film having a refractive index different from that of the prism so as to increase reflection factor variation between the critical angle of total reflection and angles of incidence very close to such critical angle; and detecting the light beam reflected by said boundary surface to derive the focussing error signal.

2. A method according to claim 1, wherein a thickness of said thin film is so determined that a phase difference between light rays reflected by upper and lower surfaces of the thin film becomes an odd integer multiple of a half wavelength.

3. A method according to claim 1, wherein said light beam is made incident upon the thin film via at least one additional thin film interposed between the prism and the thin film.

4. A method according to claim 3, wherein said thin films have alternatively lower and higher refractive indices.

5. A method according to claim 3, wherein said thin films have such thicknesses that the phase difference between upper and lower surfaces of respective thin films becomes an odd integer multiple of a half wavelength.

6. A method according to claim 1, wherein said thin film is made of material having refractive index higher than that of the prism and P-polarized light beam is made incident upon the prism and thin film.

7. A method according to claim 1, wherein said thin film is made of material having a refractive index lower than that of the prism and S-polarized light beam is made incident upon the prism and thin film.

8. An apparatus for deriving a focussing error signal of an objective lens with respect to an object on which a light beam is to be focussed by the objective lens, comprising:

a prism arranged to receive at least a part of the light beam reflected by the object and collected by the objective lens;

at least one thin film applied on said prism and made of material having a refractive index different from that of the prism so as to increase reflection factor variation between the critical angle of total reflection and angles of incidence very close to such critical angle; and a photo-detecting means arranged to receive the light beam reflected by a boundary surface between said thin film and the air and to derive the focussing error signal.

9. An apparatus according to claim 8, wherein said thin film is made of material having a refractive index higher than that of the prism and said light beam impinging upon the prism is P-polarized light.

10. An apparatus according to claim 9, wherein at least one additional thin film is interposed between the prism and the thin film.

11. An apparatus according to claim 10, wherein only one additional thin film having a refractive index lower than that of the prism is interposed between the prism and the thin film.

12. An apparatus according to claim 10, wherein said additional thin films have alternately higher and lower refractive indices than that of the prism.

13. An apparatus according to any one of claims 8, 9, 10, 11 and 12, wherein the thin film has such a thickness that a phase difference between light rays reflected by upper and lower surfaces of the thin film becomes an odd integer multiple of a half wavelength.

14. An apparatus according to claim 9, wherein said prism is made of glass having the refractive index of 1.76 and said thin film is made of $TiO_2$ having the refractive index of 2.5.

15. An apparatus according to claim 8, wherein said thin film has a refractive index lower than that of the prism and said light beam is S-polarized.

16. An apparatus according to claim 15, wherein at least one additional thin film is interposed between the prism and the thin film.

17. An apparatus according to claim 16, wherein only one additional thin film having a refractive index higher than that of the prism is interposed between the prism and the first additional thin film.

18. An apparatus according to claim 16, wherein said thin films have alternately lower and higher refractive indices than that of the prism.

19. An apparatus according to any one of claims 15, 16, 17 and 18, wherein each thin film has such a thickness that a phase difference between light rays reflected by upper and lower surfaces of each thin film becomes an odd integer multiple of a half wavelength.

20. An apparatus according to claim 18, wherein said higher and lower refractive index thin films are made of $TiO_2$ having the refractive index of 2.5 and $MgF_2$ having the refractive index of 1.4, respectively.

21. An apparatus according to claim 15, wherein said prism is made of glass having the refractive index of 1.51 and said thin film is made of $MgF_2$ having the refractive index of 1.4.

22. A method of producing a focussing error signal of an objective lens with respect to an object on which a light beam is to be focussed by the objective lens and reflected therefrom, comprising:
    introducing at least a part of the light beam reflected by the object into a prism having an incident surface, a reflection surface and an exit surface and then into a plurality of thin optical films applied successively onto the reflection surface of the prism, at in incident angle substantially equal to a critical angle of total reflection, said thin optical films having alternately lower and higher refractive indicies than that of the prism and having such a thickness that light reflected by first and second surfaces bounding each of the respective thin optical films has a phase difference equal to an odd integer multiple of a half wavelength; and
    detecting the light beam reflected by the reflection surface and optical films and emanating from the exit surface of the prism to derive a focussing error signal.

23. The method of claim 22 wherein a P-polarized light beam is made incident upon the prism and thin optical films, and the outermost film of said successive films has a higher refractive index than that of the prism.

24. The method of claim 22 wherein an S-polarized light beam is made incident upon the prism and thin optical films, and the outermost film of said successive films has a refractive index lower than that of the prism.

25. An apparatus for deriving a focussing error signal of an objective lens with respect to an object on which a light beam is to be focussed by the objective lens and reflected, comprising:
    a prism arranged to receive at least a part of the light beam reflected by the object and collected through the objective lens and having an incident surface, a reflection surface and an exit surface;
    a plurality of thin optical films successively applied onto the reflection surface of said prism and having alternating lower and higher refractive indicies than that of the prism and each having such a thicknes that light reflected by first and second surfaces bounding each of the respective films has a phase difference equal to an odd integer multiple of a half wavelength.

26. An apparatus according to claim 25, wherein said prism is made of glass having the refractive index of 1.76, said thin films having the higher refractive index are made of $TiO_2$ having the refractive index of 2.5, and said thin films having the lower refractive index are made of $MgF_2$ having the refractive index of 1.4.

27. The apparatus of claim 25 wherein the outermost thin optical film of said successive films has a higher refractive index than that of said prism when P-polarized light is made incident upon said prism.

28. The apparatus of claim 25 wherein the outermost thin optical film of said successive films has a lower refractive index than that of said prism when S-polarized light is made incident upon said prism.

* * * * *